United States Patent
Boricha et al.

(10) Patent No.: US 7,108,839 B2
(45) Date of Patent: Sep. 19, 2006

(54) PROCESS FOR THE RECOVERY OF PALLADIUM FROM SPENT SILICA

(75) Inventors: Arvindkumar Balvantrai Boricha, Gujarat (IN); Hari Chand Bajaj, Gujarat (IN); Raksh Vir Jasra, Gujarat (IN); Pradyut Ghosh, Gujarat (IN); Pushipito Kumar Ghosh, Gujarat (IN)

(73) Assignee: Council of Scientific and Industrial Research, New Delhi (IN)

(*) Notice: Subject to any disclaimer, the term of this patent is extended or adjusted under 35 U.S.C. 154(b) by 638 days.

(21) Appl. No.: 10/308,170

(22) Filed: Dec. 3, 2002

(65) Prior Publication Data

US 2004/0105799 A1    Jun. 3, 2004

(51) Int. Cl.
 *C01G 55/00* (2006.01)
(52) U.S. Cl. .................. 423/22; 423/335; 540/140
(58) Field of Classification Search .................. 423/22, 423/335; 540/140
See application file for complete search history.

(56) References Cited

U.S. PATENT DOCUMENTS

| | | | |
|---|---|---|---|
| 3,947,543 A | | 3/1976 | Thiel et al. |
| 4,041,126 A | * | 8/1977 | Baltz et al. ................ 423/22 |
| 4,331,634 A | * | 5/1982 | Shanton et al. ............ 423/22 |
| 4,360,380 A | | 11/1982 | Zarur |
| 4,578,250 A | * | 3/1986 | Dimmit et al. ............ 423/22 |
| 4,956,325 A | | 9/1990 | Ngoc Le |

FOREIGN PATENT DOCUMENTS

| | | |
|---|---|---|
| CS | 9006696 A | 7/1992 |
| GB | 798712 | 7/1958 |
| GB | 1090294 | 11/1967 |
| GB | 1578123 | 11/1980 |
| GB | 2 127 001 A | 4/1984 |
| JO | 4015266 | 1/1992 |
| JP | 61 110731 | 5/1986 |
| JP | 61238927 | 10/1986 |
| JP | 0 1189347 | 7/1989 |
| RO | 77670 A | 10/1981 |
| RO | 83032 A | 1/1984 |
| RO | 115067 B | 10/1999 |
| RU | 2095442 C | 11/1997 |
| SU | 525469 A | 11/1976 |
| SU | 833495 | 6/1981 |
| WO | WO 2004/050926 A1 | 6/2004 |

OTHER PUBLICATIONS

International Search Report Application No. PCT/IB 02/05198 dated Feb. 12, 2002.

* cited by examiner

*Primary Examiner*—Steven Bos
(74) *Attorney, Agent, or Firm*—Nixon Peabody LLP; Donald R. Studebaker

(57) ABSTRACT

The present invention provides a provides a process for the recovery of precious metals from spent catalysts or adsorbent or inorganic waste, more specifically the process relates to recovery of Pd from silica, which is used as an adsorbent in column chromatography or as a catalyst support in many catalysts.

16 Claims, No Drawings

PROCESS FOR THE RECOVERY OF PALLADIUM FROM SPENT SILICA

FIELD OF THE INVENTION

The present invention relates to the recovery of precious metals from spent catalysts or adsorbent or inorganic waste, specifically the process concerns with the recovery of Pd from silica, which is used as an adsorbent in column chromatography or as a catalyst support in many catalysts.

BACKGROUND OF THE INVENTION

Precious transition metal irons and their coordination complexes find industrial applications as supported catalysts and performance chemicals in fine chemicals industries. For example, metals like Ag, Au, Pd, Pt and Rh are used in a variety of industrial applications as catalysts for oxidation, hydrogenation and dehydrogenation reactions. Various polymeric materials modified silica, zeolite or/and various clay materials are used as support for these metals. Similarly, coordination metal complexes of Pd, Pt and Rh are used as commercial catalysts in homogeneous conditions for hydroformylation and hydrogenation reaction. However, owing to difficulties in separation of metal complexes from product mixtures, there is growing need to developed heterogenized catalysts where coordination metal complexes are supported on polymeric or inorganic solid support like silica, carbon, zeolite and alumina. Commercially, it is important to recover the precious metals from the support to the maximum extent possible once the catalyst is deactivated.

In certain situations, the catalysts are degraded during the reaction cycle or subsequent work-up and the reaction effluent may comprise of various remnants, e.g., complexes of various valence states for the metal ions. In many cases, the presence of excessive contaminants reduces the feasibility of recycling of the catalyst. However, the problem related to degradation of catalysts over the repeated cycles, contaminants over the repeated cycles, contaminants arise from side reaction and leaching of the effective catalyst for the solid support are common in some cases of heterogeneous catalysis. In view of the environmentally stipulated restrictions on disposal of metal containing waste, effective recovery of the residual precious metals from the reaction effluent is of paramount importance for a process to be environmentally acceptable and economically viable.

Furthermore, during the recovery of precious metals from ore or scrap including spent catalysts, the use of solvent extraction to separate the precious metals from one another and from base metals that may also be present is becoming more widespread. The hydrometallurgical processes employed for the separation and recovery of the platinum group metals, (e.g., platinum, palladium and rhodium), typically involve dissolving the metal ions by some type of oxidative acidic chloride leach, typically with aqua regia or hydrochloric acid/$Cl_2$ followed by solvent extraction.

The application of coordination complexes of precious metals in fine chemicals industries also requires prior purification of these complexes using silica gel as a stationary phase. For example Pd-pythalocyanine complexes namely Palladium phthalocyanine complex, Bromo phthalocyanine complex and Irgaphor green, which find applications as pigment material for compact disc coating are purified using silica gel.

Significant quantity of these complexes (up to 0.5 wt % Pd) is adsorbed in the pores of silica gel and is difficult to dislodge from the pores of silica (spent silica) by conventional elution with a solvent. Many technologies, at times specific to support and metal are used for recovery of precious metals from spent catalysts, effluent solutions.

Reference is made to the patent (Great Britain Patent no. A-2127001, 1984) wherein precious metals are recovered rapidly and efficiently from cyanide containing leach solution by loading onto an activated carbon fibre body. The main limitation of the process is that cyanide ligand should have high affinity and should form stable complexes with the metal ions to be leached out.

Reference is made to the patent CS-B-251467 (1988); Chemical Abstract 109 (24): 213964) wherein palladium is recovered from acidified wastewater by sorption on activated carbon, pre-treated with an alkali metal salt of Ethylene diamine tetra acetic acid (EDTA). However, this is useful for homogenous aqueous catalyst waste and is not directly applicable to non-aqueous systems.

Reference is made to the patent JP 54 9597 (1978) wherein, the regeneration and recovery of precious metal like palladium involves a burning step. It is disclosed in that patent, that the spent residue obtained from a catalyzed reaction performed in homogeneous condition is subjected to heating to burn out the organic fragment and then by subsequent dissolution of the palladium species in acid to the corresponding palladium salt. However, this invention has a limited scope in the sense that it is only concerned with degradation of metal complex having lower aliphatic monocarboxylic acids as the organic moiety.

Reference is made to the U.S. Pat. No. 4,331,634 (1982) wherein strongly acidic solution of sulfuric, hydrochloric, perchloric or nitric acid is used as stripping solvent for the extraction of the palladium from the organic acidic solution containing oxime as extracting reagent. The organic phase may also contain an anionic phase transfer material or catalyst to aid the extraction process. In this patent, the oximes employed for the extraction of palladium are hydroxyoxime and derivatives, which are expensive considering the industrial application.

Reference is also made to the U.S. Pat. No. 4,578,250 (1986) wherein aqueous ammonia is used as the stripping solution and along with oxime as an extracting solvent similar to those of the U.S. Pat. No. 4,331,634 (1982) but here oxime used is ether oxime, in which, the hydroxy group of the oximes are converted to ether groups. In this, case also, the oximes employed for the extraction of palladium is expensive-and not user friendly considering the industrial application. Furthermore, it is reported that after recycling certain oxime containing solvents over a period of time (e.g., ten extractions of palladium followed each time by stripping with 6M hydrochloric acid solution), the rate of palladium extraction deteriorates considerably.

Reference is made to the JP Patent 61-238, 927 (1996) wherein palladium is recovered by extraction using an aldoxime. The main limitation of these processes is the use of expensive organic ligands and organic solvents, which are difficult to recover.

Y. Baba, K. Inoue, K. Yoshizuka and T Furusawa, (Industrial engineering Chemistry—Research, Volume 29, (1990), page 21111) have described the use of non-chelating oximes such as dodecanal oxime, decanal, oxime, octanal oxime and hexanol oxime for the extraction of palladium metal. This report also has drawback in the sense that the oximes employed for the extraction are expensive considering the industrial application.

Ion exchange resins can also be used to recover precious metal ions, but it is difficult to achieve 100% metal recovery in this method and all precious metals are not also not present in the ionic state or too much of contaminants is present in the effluents to be treated.

According to the above prior art, most of the metal recovery methods are applicable to the homogeneous reaction mixtures and employs chelating agents for extracting metal ions. Process known in the prior art for recovery of metals from supported catalysts also makes use of mineral acids and invariably destroyed the support structure.

OBJECTS OF THE INVENTION

The main object of the present invention is to provide a process for the recovery of palladium from spent silica, which obviates the drawbacks as detailed above.

Another objective of the present invention is to provide a process for the recovery of precious metals or their complexes supported on solid support as in adsorbent/catalysts, specially palladium from spent silica wherein palladium is present as a mixture of palladium phthalocyanine complexes adsorbed on silica gel.

Yet another objective of the present invention is to provide a process for enabling 100% recovery of palladium with more than 99% purity.

Yet, another objective of the present invention is to recover phthalocyanine from silica along with Pd metal.

Yet another objective of the present invention to provide a process wherein silica is recovered as a value added product that can be reused.

SUMMARY OF THE PRESENT INVENTION

Accordingly, the present invention provides a process for the recovery of precious metals from spent catalysts or adsorbent or inorganic waste, specifically the process concerns with the recovery of Pd from silica, which is used as an adsorbent in column chromatography or as a catalyst support in many catalysts.

DESCRIPTION OF THE INVENTION

Accordingly, the present invention provides a process for the recovery of palladium as its salt from palladium complex adsorbed on spent silica gel, said process comprising:
  a) burning the spent silica gel with palladium complex adsorbed on its surface, in a furnace in the temperature range of 300–700° C. in presence of air for a period ranging between 2 and 8 hours to oxidize the organic compound in the complex;
  b) cooling the burnt residue of step (a), digesting with a mineral acid at a temperature range of 70–100° C. for a time period of 1–6 hours;
  c) cooling the solution of step (b) to an ambient temperature;
  d) filtering the cooled solution of step (c) to obtain a filtrate and a residue;
  e) washing the residue of step (d) with a mineral acid and drying at 60–100° C. to recover silica;
  f) adjusting the pH of the filtrate of step (d) to obtain a precipitate, filtering to remove the precipitate; and
  g) further raising the pH of the filtrate obtained in step (f) to obtain a palladium salt In an embodiment, the invention provides a process, wherein the complex is burnt in order to oxidize the organic compound, preferably in the temperature range of 350–450° C. and more preferably in the range of 350–400° C.

Another embodiment, the concentration of mineral acid used is in the range of 2–3 molar hydrochloric acid.

Still another embodiments, the original structural properties, namely surface area and pore volumes are maintained in the recovered silica and is reusable.

Still another embodiment, the concentration of the mineral acid used to wash the residue is about 0.5 M.

Yet another embodiment, the pH of the filtrate in step (e) is adjusted to about 6.0.

Yet another embodiment, the pH of the filtrate in step (e) is adjusted in the range of 8.5–9.3 and preferably 9.3.

Yet another embodiment, purity of palladium recovered in the said process is about 97–100% and the percentage yield of the palladium salt recovered in step (d) is in the range of about 95–100%.

One more embodiment of the present invention provides a process for the recovery of palladium as its salt from palladium phthalocyanine complex adsorbed on spent silica gel, the said process comprising:
  a) treating spent silica containing organic material with hydrofluoric acid;
  b) filtering the solution of step (a) to obtain a solution containing $H_2SiF_6$ and suspended palladium phthalocyanine complex;
  c) recovering palladium phthalocyanine complex of step (b) by gravity separation, digesting it by refluxing with an aqueous mineral acid for a time period of 2–4 hours;
  d) filtering the digested mixture of step (c) to remove phthalocyanine to obtain aqueous acidic filtrate solution;
  e) recovering palladium as its salt of the mineral acid by evaporation of the aqueous acidic filtrate solution of step (d); and
  f) recovering phthalocyanine ligands by solvent extraction.

Another embodiment of the invention relates to the concentration of mineral acid used in step (c), which is in the range of 2–3 molar hydrochloric acid.

Still another embodiment, the concentration of the mineral acid used in step (e) is 5–10 molar hydrochloric acid.

Still another embodiment, the preferable solvent used for extracting the phthalocynine ligand is chloroform and is reusable.

Yet another embodiment, the spent silica is recovered as a value added product namely $H_2SiF_6$.

The present invention provides a process for the 95–100% recovery with 97–100% purity of palladium as palladium chloride from spent silica wherein organic moiety is fully or partially oxidized by heat treatment at 350–450° C. in air for 3–5 hours followed by noble metals recovery as metal salt by its digestion with mineral acid like hydrochloric, sulfuric and nitric acid in the range 2–6 molar aqueous solution at 70–90° C. under constant stirring for 4–6 hours; cooling to ambient temperature and filtration and washing to recover silica and further recovery and purification of palladium metal from filtrate and precipitation of the metal salt at different pH in the range of 6 to 9.5 and washing and drying of recovered silica in oven form 80 to 110° C. alternatively process wherein the spent silica is treated with hydrofluoric acid to dissolve silica to form $H_2SiF_6$ and recovery of palladium phthalocyanine complexes by filtration followed by extraction of palladium by digestion with 2 molar aqueous hydrochloric acid and further recovery and purification of palladium metal from filtrate by precipitation of the metal salt at different pH in the range of 6 to 9.5 and recovering phthalocyanine ligands by solvent extraction using chloroform as solvent.

In an embodiment of the present invention spent silica-containing palladium is in the range 0.1 to 0.5 wt % may be calcined in air in the temperature range 350 to 450° C. for 4–6 hours.

In an embodiment of the present invention, calcined silica may be refluxed with 2–6 molar aqueous hydrochloric acid solution for 4–6 hours to leach out palladium.

In an embodiment of the present invention, silica is filtered and the pH of the filtrate may be maintained in the range 9.5 to 10.5 to precipitate palladium as palladium chloride.

In an embodiment of the present invention, silica may be dissolved in 40% hydrofluoric acid under stirring as $H_2SiF_6$ whereas palladium phthalocyanine complex, which is insoluble in hydrofluoric acid, is recovered by filtration.

In an embodiment of the present invention, suspended Pd-complex may be recovered by solvent extraction process using organic solvent like chloroform and dichloromethane.

In an embodiment of the present invention, the extracted palladium phthalocyanine complex may be de-metallated using aqueous hydrochloric acid under reflux conditions. Subsequently, phthalocyanine ligands were recovered by solvent extraction suing organic solvents like chloroform and dichloromethane, and palladium was recovered as palladium chloride from aqueous phase by precipitation.

In an embodiment of the present invention phthalocyanine fragments remaining in organic phase may be recovered by distillation.

In an embodiment of the present invention, chloroform and dichloromethane used may also be recovered in the process by distillation.

In the process invented, spent silica is thermally treated in air to partially burn the organic moiety of the palladium phthalocyanine complex followed by palladium extraction by acid digestion and purification by judiciously adjusting the pH of filtrate obtained. Recovered silica retains its structure and can be re-used. Analysis of Pd in the silica and after its recovery was done by ICP—Inductively Coupled Plasma Emission Spectrometer (ICP-spectrometer) and Spectrophotometically as $[PdI_4]^{2-}$ complex.

Palladium is estimated, in acidic aqueous solution as brown-red complex, $[PdI_4]^{2-}$. In an acid medium (hydrochloric acid, $H_2SO_4$) containing excess of iodide, palladium forms a brown-red complex, $[PdI_4]^{2-}$. The molar absorptivity of the complex is $1.02 \times 10^{-4}$ at $\lambda_{max}$=410 nm (a=0.096). A calibration curve is obtained by preparing a palladium iodide complex solution by dissolving the known amounts of palladium chloride and other reagent, like concentrated hydrochloric acid, ascorbic acid and potassium iodide. The detailed procedure is as follow:

Accurately measured volume/weight of the sample solution/solid containing (2 w/v) not more that 1 mg of Pd was taken in a 100 ml volumetric flask. To this was added 10 ml of 6N hydrochloric acid, 20 ml of 20% (w/v) potassium iodide solution and 4 ml of 1% (w/v) ascorbic acid solution. The volume was made up to 100 ml with water in a 100 ml volumetric flask and absorbance 410 n, against water was measured Wt of Palladium in the diluted solution can be obtained as:

Weight of Pd % 100 ml=(A/E). (Mol. Wt of Palladium)

A=Absorbance of the 100 ml solution at 410 nm
E=Extinction coefficient, $1.02\,E^4\,cm^{-1}$ for species at 410 nm Palladium has also be estimated spectrophotometically using inductively coupled plasma emission spectrometer (ICP—This is most accurate method of estimation of metals ions at PPM/ppb levels. A calibration curve was obtained, by dissolving a known amount of palladium chloride in hydrochloric acid and recording its intensity on ICP spectrometer for palladium at 340.458 nm, using Perkin Elmer's Inductively Coupled Plasma Emission Spectrometer.

a) Thermal treatment of spent silica at an appropriate temperature such that organic moiety is only partially oxidized without the formation of metal oxide. Scientifically speaking, during thermal treatment, palladium phthalocyanine complex, which is trapped in the pores of silica, is desorbed and organically rich phthalocyanine moiety is partially oxidized to volatile compounds. Partially oxidized palladium complex gets deposited on the external surface of silica and can easily react with mineral acid used for digestion. The major inventive step involved in the present invention is selectively partially oxidizing palladium phthalocyanine complex so that it does not form palladium oxide, which is difficult to react with mineral acid under normal processing conditions.

b) Recovery of pure palladium with 99–100% purity and 95–100% recovery as palladium chloride by judicially adjusting the pH of the aqueous solution and thereby removing the impurities namely iron, zinc, nickel and silica.

c) Recovery of pure palladium without resorting to the use expensive and hazardous organic solvent and complexing ligands.

d) Recovery of pure palladium without destroying structure of the inorganic support namely silica in the present case.

The following examples are given by way of illustration and therefore should not be constructed to limit the scope of the present invention.

EXAMPLE 1

500 g of spent silica, wherein palladium is present as a mixture of palladium phthalocyanine complexes adsorbed on silica gel, was taken in a china dish and kept at 400° C. in a muffle furnace in air atmosphere for three hour and than allowed to cool to ambient temperature. 1000 ml 2M aqueous hydrochloric acid solution was taken in a 5 liters round bottom flask equipped with heating mantle and thermocouple to heat the content of the round bottom flask at constant temperature. To this was added above treated silica and the whole content of the round bottom flask at constant temperature. To this was added above treated silica and the whole content was refluxed at 90° C. for five hours. It was filtered with Buckner funnel after cooling to ambient temperature followed by washing with 0.5 M aqueous hydrochloric acid and then dried at 100° C. in an oven. The pH of the filtrate, which contained palladium, was raised to 6 and precipitate formed filtered to remove impurity especially of silica, iron and other metals. The precipitates were collected and dried. The pH of the filtrate obtained at pH 6 was raised to 9.3 and precipitate collected and dried.

The precipitates obtained at pH 6 and 9.3 were analyzed for palladium content. 0.745 g, of the precipitate was obtained at pH 6, which contains no palladium. 0.228 g of precipitate collected at pH 9.3 contains 98.67% palladium determine spectrophotomertically. The total palladium content adsorbed on the silica, estimably separately using known procedure of repeatedly treating with aqua regia and hydrochloric acid finally estimating Pd by ICP sepctrometry) was 0.23 g showing 99–100% recovery by above process.

EXAMPLE 2

500 g of spent silica was taken in a china dish and kept at 700° C. in a muffle furnace in air atmosphere for three hour and than allowed to cool to ambient temperature. 1000 ml 2 M aqueous HCl solution was taken in a 5 liters round bottom flask equipped with heating mantle and thermocouple to heat the content of the round bottom flask at constant temperature. To this was added above treated silica and the whole content was refluxed at 90° C. for five hours. It was filtered with Buckner funnel after cooling to ambient temperature followed by washing with 0.5-M aqueous hydrochloric acid solution. Silica was dried at 100° C. in an oven. The pH of the filtrate, which contained palladium, was raised to 6 and precipitate formed filtered to remove impurity especially of silica, iron and other metals. The precipitates were collected and dried. The pH of the filtrate obtained at pH 6 was raised to 9.3 and precipitate collected and dried.

The precipitated obtained at pH 6 and 9.3 were analyzed for palladium content. 0.745 g, of the precipitate was obtained at pH 6 contains nil palladium, 0.226 g of precipitate collected at pH 9.3 also contains nil palladium and 0.25 g of the precipitate collected at pH 11 also contains nil palladium as determined spectrophotomertically.

EXAMPLE 3

The above experiment was repeated except that the silica was calcined at 300° C. There was nil recovery of palladium from precipitates obtained after adjusting pH at different value of 6, 9 and 11 of the filtrate obtained after acid digestion.

EXAMPLE 4

500 g silica waste was calcined at 400° C. in a muffle furnace in air atmosphere for three hours. After cooling the sample to ambient temperature, it was digested with 1000 ml 2M aqueous hydrochloric acid solution. Filtered and washed the content to remove silica and finally filtrated was evaporated it to dryness on water bath/hot place to get solid mass. It gave 2.07 g inorganic solid, which contained 122.5 mg of palladium chloride.

EXAMPLE 5

500 g silica waste was calcined at 400° C. in a muffle furnace in air atmosphere for three hours and after that it was digested with 1000 ml aqua regia (750 ml concentrated hydrochloric and 250 ml concentrated nitric acid). The content was filtered and pH of the filtrated was adjusted to 6 and filtered again. It gave 208 mg brown colored solid with nil $PdCl_2$ content. The pH of the filtered was raised to 9.5 and again filtered. It gave 740 mg solid, again with nil palladium in it.

EXAMPLE 6

100 g silica wastes, as such was treated with 100 ml aqua regia (75 ml concentrated hydrochloric acid and 25 ml concentrated nitric acid) and mixture kept for 3–4 hours, then decanted and the filtrate was analyzed for Pd spectrophotomertically. It gave no test for palladium.

EXAMPLE 7

770 g of spent silica (crude deep green in colour) was added to 3500 g HF (40%) and stirred by magnetic stirrer. $SiO_2$ dissolves in HF solution as $H_2SiF_6$ and palladium phthalocyanine complex, being insoluble in aqueous HF media remains suspended. Palladium phthalocyanine complex (1.950 g) was recovered from aqueous HF media by gravity filtrations and washed with water. Finally, it was extracted with chloroform. Chloroform was removed on rotaevaporater. It gave 1.95 g of green color palladium phthalocyanine complex.

EXAMPLE 8

100 g spent silica (crude deep green in color was added to 500 g HF (40%) and stirred by magnetic stirrer. $SiO_2$ dissolve in HF solution as $H_2SiF_6$ and palladium phthalocyanine complex, being insoluble in aqueous HF media remain suspended. Palladium phthalocyanine complex (200 mg) was recovered from aqueous HF media by gravity filtration and washed with water and dried. Palladium phthalocyanine complex so recovered was refluxed with 100 ml 2 M hydrochloric acid for 2 hours, than it was filtered to remove phthalocyanine. Palladium was recovered as PdCl2 (39 mg) by evaporation of aqueous acidic solution.

EXAMPLE 9

500 g of spent silica was taken in a china dish and kept at 400° C. in a muffle furnace in air atmosphere for three hours and then allowed to cool to ambient temperature. 1000 ml 2M aq. HCl solution was taken in a 5 liters round bottom flask equipped with heating mantle and thermocouple to heat the content of the round bottom flask at constant temperature.

To this was added above treated silica and the whole content was refluxed at 90° C. for five hours. It was filtered with Buckner funnel after cooling to ambient temperature followed by washing with 0.5-M aqueous HCl solution. Silica was dried at 100° C. in an oven. Recovered silica following heat treatment and acid digestion showed no difference in XRD, IR and surface area with respect to original silica.

EXAMPLE 10

10 kg calcimined spend silica, calcination was done in indirect fixed calciner, which can calcine the material at 400 to 700° C. in a continuous process at 2–10 kg per hour rate depending upon the residence time was placed in a 50-litters capacity round bottom flask equipped with heating and stirring facilities. To this, were added 3.33 litters of concentrated hydrochloric acid and 16.5 liter of de-ionised water. The content of flask was refluxed at 90° C. for 5 hours. After it cools down, it was filter off with Buckner funnel to remove silica and the filtrate was collected in a container. The silica was washed with de-ionized water and the washing was mixed with the filtrate. The pH of the filtrate containing Palladium was adjusted to 6.0 with sodium hydroxide and it was filtered to remove non-palladium metal impurities. Again the pH of this filtrate is adjusted to 9.3–9.5 with sodium hydroxide solution, wherein palladium metal is precipitated as palladium chloride. This was filtered off and washed with de-ionised water till it is chloride free. The precipitate after washing are dried in oven night and analyzed for palladium content. If required the sample can be further purified by re-dissolving the impure Pd containing sample in slightly warm 1M HCl solution and then adjusting its pH to 6.3 and filtering off the impurity (if any) and then finally precipitating the pure $PdCl_2$ at pH 9.3 By the above procedure, it gave 12.5 g-palladium chloride of 97–99% purity.

The main advantages of the present invention include:
a) Thermal treatment of spent silica at reasonably lower temperature of less than 450° C.
b) Recovery of palladium with 99–100% recovery as palladium chloride.
c) Recovery of palladium without resorting to the use expensive and hazardous organic solvent and complexing ligands.
d) Recovery of pure palladium without destroying structure of the inorganic support silica.
e) Possibility of recovering expensive phthalocyamine ligands as well as silica as a value added product.

The invention claimed is:

1. A process for the recovery of palladium as its salt from palladium complex adsorbed on spent silica gel, said process comprising steps of:
   a) burning the spent silica gel with palladium complex adsorbed on its surface, in a furnace in the temperature range of 300–700° C. in presence of air for a period ranging between 2 and 8 hours to oxidize the organic compound in the complex;
   b) cooling the burnt residue of step (a), digesting with a mineral acid at a temperature range of 70–100 C. for a time period of 1–6 hours to form a solution;
   c) cooling the solution of step (b) to an ambient temperature;
   d) filtering the cooled solution of step (c) to obtain a filtrate and a residue;
   e) washing the residue of step (d) with a mineral acid and drying at 60–100 to recover silica;
   f) adjusting the pH of the filtrate of step (d) to obtain a precipitate, filtering to remove the precipitate to obtain a further filtrate; and
   g) further raising the pH of the further filtrate obtained in step (f) to obtain a palladium salt.

2. A process as claimed in claim 1, wherein in step (a), the palladium complex is burnt in the temperature range of 350–450 and more preferably in the range of 350–400° C.

3. A process as claimed in claim 1, wherein in step (b) the concentration of mineral acid is in the range of 2–3 molar hydrochloric acid.

4. A process as claimed in claim 1, wherein in step (e), the original structural properties of a surface area and pore volumes are maintained in a recovered silica.

5. A process as claimed in claim 1, wherein in step (e), the recovered silica is reusable.

6. A process as claimed in claim 1, wherein in step (e), the mineral acid is 0.5-M hydrochloric acid.

7. A process as claimed in claim 1, wherein in step (d), the pH of the filtrate is adjusted to about 6.0.

8. A process as claimed in claim 1, wherein in step (f), the pH of the further filtrate is adjusted in the range of 8.5–9.3, preferably pH 9.3.

9. A process as claimed in claim 1, wherein in step (g), the purity of palladium salt obtained is about 97–100%.

10. A process as claimed in claim 1, wherein the percentage yield of the palladium salt recovered in step (g) is in the range of about 95–100%.

11. A process for the recovery of palladium as its salt from palladium phthalocyanine complex adsorbed on spent silica gel, said process comprising steps of:
    a) treating the spent silica gel containing organic material with hydrofluoric acid to obtain a solution;
    b) filtering the solution of step (a) to obtain a solution containing $H_2SiF_6$ and suspended palladium phthalocyanine complex;
    c) recovering palladium phthalocyanine complex of step (b) by gravity separation, digesting the palladium phthalocyanine complex by refluxing with an aqueous mineral acid for a time period of 2–4 hours to form a digest mixture;
    d) filtering the digested mixture of step (c) to remove phthalocyanine to obtain an aqueous acidic filtrate solution;
    e) recovering palladium as its salt of the mineral acid by evaporation of the aqueous acidic filtrate solution of step (d); and
    f) recovering phthalocyanine ligands by solvent extraction.

12. A process as claimed in claim 11, wherein in step (c) a, concentration of mineral acid is in a range of 2–3 molar hydrochloric acid.

13. A process as claimed in claim 11, wherein in step (e) a concentration of the mineral acid is in a range of 5–10 molar hydrochloric acid.

14. A process as claimed in claim 11, wherein in step (f) the solvent is chloroform.

15. A process as claimed in claim 11, wherein in step (b) the spent silica is recovered as $H_2SiF_6$.

16. A process as claimed in claim 11, wherein the solvent in step (f) is reusable.

* * * * *